US011161084B2

(12) United States Patent
Speth et al.

(10) Patent No.: US 11,161,084 B2
(45) Date of Patent: Nov. 2, 2021

(54) COOLED AXIAL FLOW CONVERTER (71) Applicant: Haldor Topsøe A/S, Kgs. Lyngby (DK)

(72) Inventors: Christian Henrik Speth, Lynge (DK); Per Juul Dahl, Vedbæk (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/763,862

(22) PCT Filed: Dec. 19, 2018

(86) PCT No.: PCT/EP2018/085899
§ 371 (c)(1),
(2) Date: May 13, 2020

(87) PCT Pub. No.: WO2019/121953
PCT Pub. Date: Jun. 27, 2019

(65) Prior Publication Data
US 2021/0170353 A1  Jun. 10, 2021

(30) Foreign Application Priority Data
Dec. 20, 2017  (DK) ............................ PA 2017 00733

(51) Int. Cl.
*B01J 8/04* (2006.01)
*B01J 8/00* (2006.01)
(Continued)

(52) U.S. Cl.
CPC .............. *B01J 8/0469* (2013.01); *B01J 8/008* (2013.01); *B01J 8/0492* (2013.01); *B01J 8/0496* (2013.01);
(Continued)

(58) Field of Classification Search
CPC ...... B01J 8/0469; B01J 8/0496; B01J 8/0461; B01J 8/0257; B01J 8/0278; B01J 2208/021; B01J 2208/0015; B01J 2208/00814
See application file for complete search history.

(56) References Cited

U.S. PATENT DOCUMENTS 3,663,179 A    5/1972 Mehta et al.
4,180,543 A  * 12/1979 Ward .................... B01J 8/0005
                                                      422/148
(Continued)

FOREIGN PATENT DOCUMENTS

CN    102872767 A    1/2013
EP    0 080 270 A2   6/1983
(Continued)

*Primary Examiner* — Lessanework Seifu
(74) *Attorney, Agent, or Firm* — Blank Rome LLP (57) ABSTRACT In a cooled axial flow converter, in which process gas passes from an outer annulus via a catalyst bed, wherein the process gas is converted to a product, to an inner centre tube, the catalyst bed comprises at least one module comprising at least one catalyst layer. Feed means are arranged to provide a flow of process gas from the outer annulus to an inlet part of one or more modules, and collector means are arranged to provide a flow of product stream of converted process gas, which has passed axially down the catalyst bed of one or more of the modules to the centre tube. At least one of the one or more modules comprises one or more cooling plates arranged to be cooled by a cooling fluid.

26 Claims, 4 Drawing Sheets (51) Int. Cl.
*C01C 1/04* (2006.01)
*C01B 3/16* (2006.01)

(52) U.S. Cl.
CPC .............. *C01B 3/16* (2013.01); *C01C 1/0417* (2013.01); *B01J 2208/0015* (2013.01); *B01J 2208/021* (2013.01); *C01B 2203/0283* (2013.01); *C01B 2203/0883* (2013.01)

(56) References Cited

U.S. PATENT DOCUMENTS

| | | | |
|---|---|---|---|
| 4,298,589 | A | 11/1981 | LeBlanc et al. |
| 5,052,482 | A | 10/1991 | Gondouin |
| 6,982,066 | B2 * | 1/2006 | Filippi .................... B01J 8/025 |
| | | | 422/198 |
| 2012/0237415 | A1 | 9/2012 | Ramos et al. |

FOREIGN PATENT DOCUMENTS

| | | |
|---|---|---|
| EP | 0 231 683 A1 | 8/1987 |
| EP | 0 931 586 A1 | 7/1999 |
| EP | 1 419 813 A1 | 5/2004 |
| EP | 1 477 220 A1 | 11/2004 |
| EP | 2 070 590 A1 | 6/2009 |
| RU | 2 608 092 C2 | 1/2017 |
| WO | WO 03/031048 A1 | 4/2003 |
| WO | WO 2004/035198 A1 | 4/2004 |
| WO | WO 2006/010565 A1 | 2/2006 |
| WO | WO 2009/106231 A1 | 9/2009 |
| WO | WO 2011/124442 A1 | 10/2011 |

\* cited by examiner

Fig 5

COOLED AXIAL FLOW CONVERTER

The present invention relates to a cooled axial flow converter, in which process gas passes from an outer annulus via a catalyst bed wherein the process gas is converted to a product, to an inner centre tube.

Ammonia converters are complicated due to the fact that, as mentioned, the synthesis of ammonia from nitrogen and hydrogen gas (in an approximate ratio of 1:3) is exothermic, and the reactions take place at high temperatures and pressures. Thus, inter-stage cooling is generally used between a series of catalyst zones to maintain kinetic and equilibrium conditions appropriate for optimum conversion efficiency. There must also be provisions made for servicing the catalyst zones, e.g. periodically removing and replacing catalysts when they lose their effectiveness.

Because ammonia converters are complicated, but also very important pieces of equipment, many efforts are made to improve their efficiency. Thus, US 2004/0096370 A1 discloses a split-flow vertical ammonia converter, in which a fixed-bed catalyst zone is configured into two mechanically separated catalyst volumes and two gas streams operating in parallel. This design maintains the ratio of gas flow to catalyst volume so that there is no catalyst effectiveness loss. The catalyst beds and gas flow paths are configured so that the gas flow is downwards through each catalyst volume.

When low pressure drop is required in a fixed bed catalytic converter, a radial flow type converter is often selected. However, in special cases, such as a cooled catalyst bed, catalyst shrinkage or catalyst particles having low strength combined with a high catalyst bed, this solution is not practical, and instead inter-bed cooling or parallel reactors must be selected.

A solution could consist in replacing the radial flow bed with a stack of identical axial flow canisters. Although the flow through each individual canister is axial, the assembly can have a flow pattern as a radial flow reactor, for instance taking feed flow from an outer annulus and disposing the reactor effluent to an inner tube. The bed height can be adjusted to meet the requirement for pressure drop and catalyst strength without changing the principal layout of the reactor.

Thus, the present invention relates to a cooled axial flow converter, in which process gas passes from an outer annulus via a catalyst bed wherein the process gas is converted to a product, to an inner centre tube, wherein
- the catalyst bed comprises at least one module comprising at least one catalyst layer,
- feed means are arranged to provide a flow of process gas from the outer annulus to an inlet part of one or more the modules,
- collector means are arranged to provide a flow of product stream of converted process gas which has passed axially down the catalyst bed of one or more of the modules to the centre tube, and
- at least one of the one or more modules comprises one or more cooling plates arranged to be cooled by means of a cooling fluid.

When the converter comprises an outer annulus, wherein the process gas flows, feed means for bringing the process gas from the annulus to the inlet of at least one module comprising at least one catalyst layer, as well as collector means for collecting the product stream, i.e. the process gas which has passed through the catalyst in a module and bringing the collected product stream to an inner center tube, several advantages are achieved, such as:

- The reactor shell is kept at the lowest possible temperature in case of an exothermic reaction
- The modules comprising the catalyst(s) enables easier loading/unloading as the modules may be loaded with catalyst outside the converter
- The modular design enables internal split flow considerably reducing the overall reactor dP
- The unique module design enables use of modules with variating diameter for better utilization of the reactor volume
- The modular design enables a low reactor diameter/height ratio reducing plot area and making transportation easier In various advantageous embodiments, the feed means are at least partly contained in the cooling plates, i.e. the process gas is passed through the cooling plates acting as a cooling medium for the surrounding catalyst in the module.

This means that the cooling plates and feed means may be arranged to allow the process gas to be pre-heated while passing through said feed means while, at the same time, the reaction heat is at least partly removed from the one or more catalyst layers in the module.

It is preferred that the cooled axial flow converter comprises two or more modules, and also that the one or more cooling plates of each module divides the module into two or more cooled catalyst channels having a total catalyst cross sectional area Acat. In case of more than one module the modules may be stacked in the converter.

In a preferred embodiment of the cooled axial flow converter of the invention, the cooling plates comprise at least one cooling channel having a width W and a height H, and the module comprises a cooled catalyst layer with height H. Furthermore, the total cross sectional area of the cooling plates of a module is Acool. The ratio Acat/Acool may be decided based on the specific cooling requirement.

In order to achieve a uniform temperature of the catalyst between the cooling plates the distance between adjacent cooling plates preferably deviates by maximum ±15% from constant. Depending on the setup, maximum deviation in distance between adjacent cooling plates may be ±10%, ±5% or 2%. Preferably the deviation in distance between two adjacent cooling plates is close to ±0% as this will give even cooling of the catalyst bed and therefore optimal reactor performance.

The cooling plates may be arranged in various ways in order to achieve the equidistant design of the cooling plates, e.g. as concentric rings around the inner center tube or as an Archimedes screw with center axis along the inter center tube.

In a further preferred embodiment of the cooled axial flow converter, the converter is arranged for two or more of the modules to be operated in parallel and/or in series. Especially a parallel modular arrangement enables a reactor design with overall low pressure drop in axial flow catalyst beds. Modules may be arranged in parallel in order to reduce pressure drop while modules may be arranged in series in order to increase conversion.

Preferably the converter is arranged to ensure that the pressure drop Dp is the same within ±5% across modules operated in parallel. This will ensure equal gas distribution per catalyst between the modules i.e. in order to provide an equal or close to equal flow of process gas through the modules. Preferably the pressure drop difference between modules are close to 0% as this will ensure equal gas distribution between the modules whereby optimal reactor performance is ensured.

If the height H of cooling channel and catalyst layer of modules operated in parallel are the same within ±5%, then embodiments may be achieved where the flow of process gas is the same in the parallel modules.

An advantageous distribution of process gas between parallel modules may also be achieved when the ratio between the total cross sectional area of the cooling plates (Acool) and the total catalyst cross sectional area (Acat) are the same within ±10% of modules operated in parallel.

So the modules may preferably have identical or close to identical cooling channel and catalyst channel height within plus/minus five percent, identical ratio between cooling channel and catalyst channel width within plus minus ten percent, identical ratio between cooling channel and catalyst channel cross sectional area within plus minus five percent and/or contain identical type of catalyst.

In some embodiments the module(s) comprises an adiabatic layer above and/or below the one or more cooled catalyst layers, said adiabatic layer having a diameter (dadi), a cross sectional area (Aadi) and a height (Hadi), where the height (Hadi) of the adiabatic catalyst layer/layers in the modules operated in parallel are identical ±5%.

Adiabatic layers added below the cooled catalyst layer(s) may at least partly be arranged in the collecting means, i.e. the product gas leaving the cooled catalyst may pass through an adiabatic catalyst layer as it passes via the collecting means to the center tube.

Similar to the conditions for the cooled catalyst, the height (Hadi) of the adiabatic catalyst layer/layers in the modules operated in parallel may be identical +−maximum five percent preferably +−0 in order to provide a converter with an optimized flow through all the modules in the reactor.

Thus, it is preferred that modules operated in parallel have the same cooling plate/catalyst cross section/height ratio whereas modules operated in series may have different configurations of cooling plates and catalyst as the ideal requirements of nearly identical dP across the modules does not apply to the serial modules.

The modules are functionally identical when they have identical cooling channel and catalyst channel height within plus/minus five percent, identical ratio between cooling channel and catalyst channel width within plus minus ten percent, identical ratio between cooling channel and catalyst channel cross sectional area within plus minus five percent and contains identical type of catalyst. The functional identical module design ensures that the flow/catalyst volume (space velocity) through each module is the same.

In general, it may desirable to have similar space velocity through at least some of—preferably all of—the modules in order to ensure equal conversion of the process gas as it passes through the modules.

So preferably the modules are arranged to achieve similar space velocity through each of modules working on parallel.

For example, all modules may have the same height containing the same catalyst layers. The diameter of the modules may vary, e.g. in order to physically fit into different areas of the converter, as long as the catalyst is the same in all the modules and as long as the distribution/ratio of catalyst channels and cooling channels are the same.

I.e. low difference in Dp between modules operated in parallel is preferred and may be ensured if:

the height H of cooling channel and catalyst layer of modules operated in parallel are preferably the same within ±5%.

the difference between cooling plates of modules operated in parallel deviates by maximum 15% from constant. Preferably the deviation is close to 0% the ratio between the total cross sectional area of the cooling plates (Acool) and the total catalyst cross sectional area (Acat) are preferably the same within ±10% of modules operated in parallel.

A reactor shell typically has a bottom and a top spherical or ellipsoidal section with reduced diameter. It is an important feature of the invention that the modules are allowed to be different in diameter also when operated in parallel which may be achieved when the above module requirements are met as equal gas distribution per catalyst and cooling channel area will still be achieved.

In further preferred embodiments, the flow in the cooling channels is either counter-current or co-current to the flow in the catalyst channel depending on catalyst performance and reaction thermodynamics. The counter-current design gives the optimum cooling and simplest mechanical module design. However, a counter-current design can in some cases lead to too much cooling the wrong place, a phenomenon which especially can happen at low capacity, say at 30 to 70%. The co-current design does not have this problem but is because of a required extra channel more mechanically complicated and takes up more expensive reactor space.

Each or some modules may be provided with means to enable the removal and/or insertion of the module from/to the reactor to allow loading/unloading/maintenance outside the reactor.

The module(s) preferably has a diameter which is smaller than the inner diameter of the converter/reactor vessel, leaving an outer annulus wherein the incoming raw gas can distribute to the relevant modules. Each module preferably further has an inner center tube wherein the product gasses are collected prior to leaving the module.

The reactor may be arranged with two or more module sections, each module section containing one or more modules. The sections may be separate in order to be able to have different flow and pressure conditions in the sections.

A quenching zone may be arranged to quench the product gas from at least one module section, thereby obtaining a quench product stream in which case the converter further may comprise means to provide at least part of the quench product stream as feed for one or more subsequent sections.

Fresh process gas and/or partly converted, optionally cooled process gas can be used as quench gas. Use of quench is a method of reducing the reactivity of gas and remove heat from an exothermic reaction The modules in different module sections may be different from each other, contain different catalyst and be arranged differently. For example, the modules in a first section, receiving a very reactive fresh unmixed process gas, may be operated at a lower temperature and contain a less reactive catalyst than the modules in a subsequent section, which receives the product gas from the first section (optionally mixed with e.g. cooled process gas), which is less reactive than the unmixed unreacted process gas received by the modules in the first section.

The at least two or more module sections may be arranged to operate in parallel to achieve an overall low pressure drop. An example could be to parallel sections, each section containing two module operating in series. Such a design will give a considerably lower pressure drop for the double space velocity.

Alternatively, two or more module sections are arranged to operate in series with a quench zone between a first and a second module sections. The module arrangement in each section can in this case variate.

A combination of parallel and series sections operation is also possible if required by the reaction process. Some modules section may be arranged in parallel in order to reduce pressure drop while others may be arranged in series in order to increase conversion.

Without being limited thereto, the cooled axial flow converter according to the present invention can be used as ammonia reactor, methanol reactor, methanisation reactor or shift reactor, and it can further be used in connection with other exothermic reaction processes.

In a further embodiment of the invention, the cooled axial flow converter may contain additional means to supply pre-heated (hot) process gas, coming for example from an internal or external start-up heater, to the catalyst loaded in selected or all of modules placed in the one or more module sections of the converter. These means, referred to as the direct inlet gas system, may serve as an important tool to enable reduction of catalyst during the initial startup/activation of the catalyst. The said direct inlet gas system is arranged to bypass both the outer annulus and the cooling plates, allowing introduction of hot process gas during reduction which would otherwise exceed the design temperature or the pressure shell and/or the cooling plates. Without the separate direct inlet gas system, the possible temperature level of the catalyst would in many cases be limited, resulting in a prolonged and inefficient reduction period.

In a further preferred embodiment of the invention, the said direct inlet gas system is also utilized to supply fresh (cold) process gas to one or several catalyst layers of the one or more modules contained in the one or more module sections during normal operation of the converter, i.e. after initial reduction/activation of the catalyst. The flow of process gas transported through the direct inlet gas system may be controlled by one or more valves located outside the converter. This system enables control the temperature level of the catalyst during normal operation. For example, during the initial period of the catalyst lifetime, where the catalyst activity is at its maximum, or during reduced load (feed flow) to the converter, the fraction of feed gas introduced through the direct inlet gas system can be increased to cool the catalyst being heated by the exothermic reaction. Similarly, as the catalyst deactivates and/or the converter load is raised, the fraction of feed gas sent through the said direct inlet gas system may be reduced to allow enhanced heating of the remaining feed gas being preheated in the cooling plates. The utilization of the said direct inlet gas system for both scenarios, heating during the reduction period and temperature control during normal operation, ensures optimal utilization of the available converter volume instead of designing the converter with two separate means/systems to supply preheated (hot) and fresh (cold) process gas respectively.

Thus, by the present invention is provided a converter comprising a modular cat bed which provides a very high degree of flexibility. The modular structure allows highly specialized convertors and catalyst beds specially adapted to fulfill the needs of various processes and reactor limitations. The physical properties of the modules may be varied and optimized for example to accommodate modules with a smaller radius in top and/or bottom of the reactor and allowing full diameter modules where the convertor vessel is widest. The modular structure also enables highly specialized catalyst bed with different catalysts in different sections of the convertor as well as providing quench zones between sections where desirable. Depending on the use such as ammonia reactor, methanol reactor, methanization reactor, shift reactor and other exothermic reaction processes, but not limited to this the different parameters of the converter may be changed and optimized. For example, the number of modules in the converter may be varied and the converter may comprise one, two, three or more sections with the possibility of quench zones between all sections or some sections.

The catalyst in the modules may also be varied as each module may be arranged to contain a single catalyst layer or several identical or different catalyst layers. In some embodiments all modules contain the same type of catalyst in the same configuration whereas in other embodiments at least some modules comprise different catalyst or different catalyst configuration i.e. different number of layers, different catalyst layer height(s) etc.

The modular built of the catalyst bed in the convertor furthermore allows some or all of the modules to be loaded outside the convertor vessel and subsequently loaded into the convertor vessel. The fact that the catalyst is arranged in modules also may ease the unloading of the catalyst from the convertor as the modules may be hoisted out one by one. Being able to remove all or some of the modules may not only be an advantage when the catalyst bed needs to be changed, but it may also be highly advantageous during convertor maintenance allowing removal of all of or a part of the catalyst bed which subsequently may be loaded back in module by module even reusing the existing catalyst. The basic concept of axial-radial flow, where the process gas flows axially through the catalyst bed and flows radially via the collector means to the center tube allows, even with a single module, a convertor with a low pressure drop. Furthermore, the flow of process gas in the outer annulus result in a lower temperature impact on the convertor shell and thereby also a lower outer reactor wall temperature.

The lower pressure drop provided combined with the possibility of having several stacked modules allows tall slim converters having a large catalyst volume with a low diameter.

In the following, the invention is further described by exemplary embodiments in FIGS. 1-5. The figures are provided as illustrations of features of various embodiments according to the present invention and are not to be construed as limiting for the invention.

Figures 1, 2A, 2B:
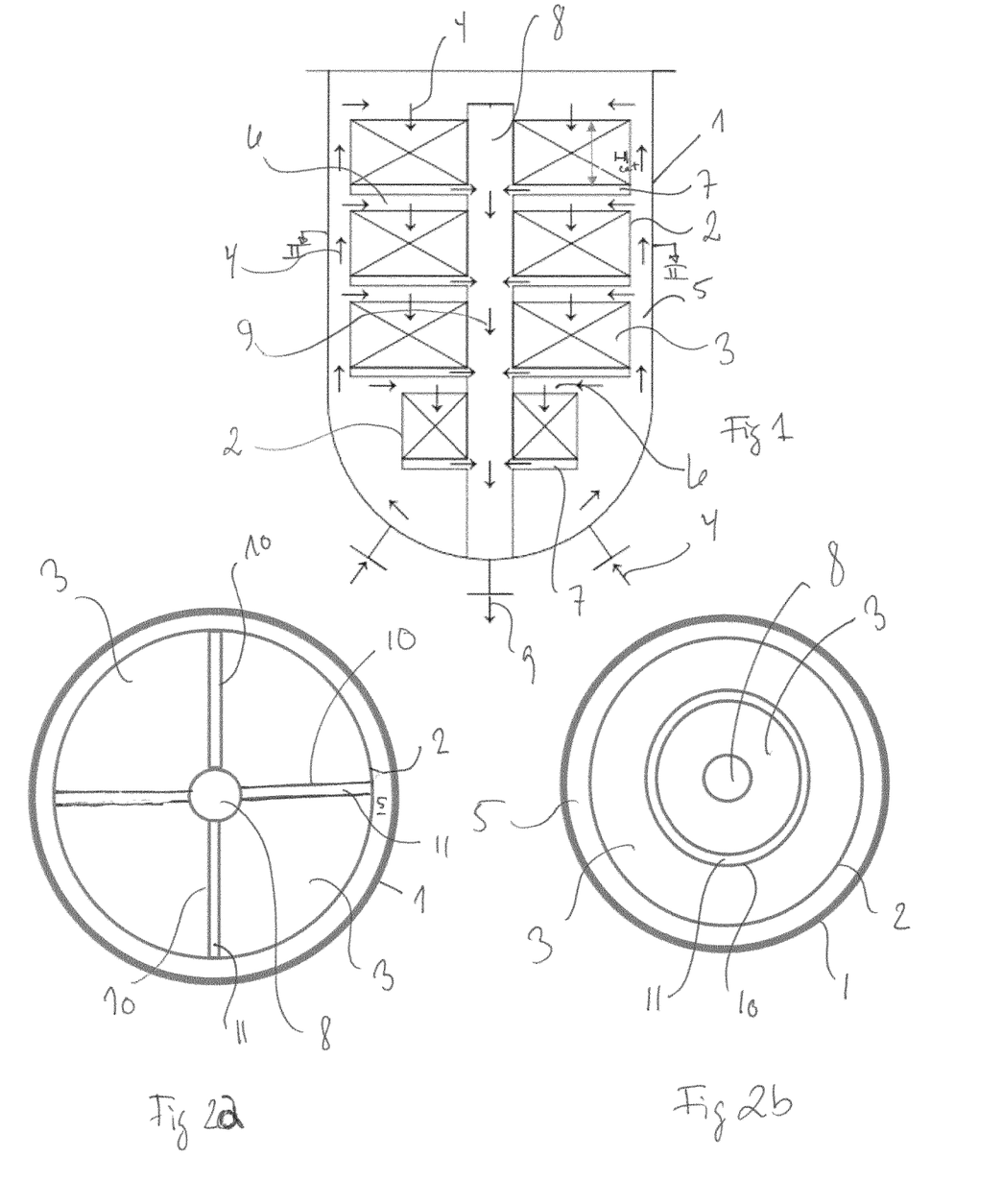

FIG. 1 shows a schematic view of a cross section of a converter 1 according to the present invention. The converter comprises four modules 2 each having a single catalyst layer 3. The four modules are operated in parallel as process gas 4 passes from an outer annulus 5 to the inlet part 6 of each of the modules. The process gas passed axially through each catalyst bed and is collected in collecting means 7 in relation to each module from where it flows to a center tube 8 and leaves the convertor as product gas 9. The modules and thereby the catalyst layers vary in diameter as three of the modules have the same diameter and the fourth module situated in the bottom of the converter has a smaller diameter in order to fit in the bottom of the converter. The catalyst layer in the modules have the same height H which means that if the catalyst in each of the four modules are of the same type the pressure drop across each module will be the same.

FIGS. 2a and b shows a cross sectional view of a reactor as shown in Fig. b in the direction II-II. FIG. 2a illustrates the case of a module having two cooling plates 10 each having a cooling channel 11. The cooling plates are situated radially and adjacent from the center tube 8 and divides the catalyst in to two halves i.e. two catalyst sections. In FIG. 2b, the single cooling plate 11 is situated concentric around the center tube thereby dividing the catalyst layer in the module into two concentric catalyst sections.

Figure 3A:
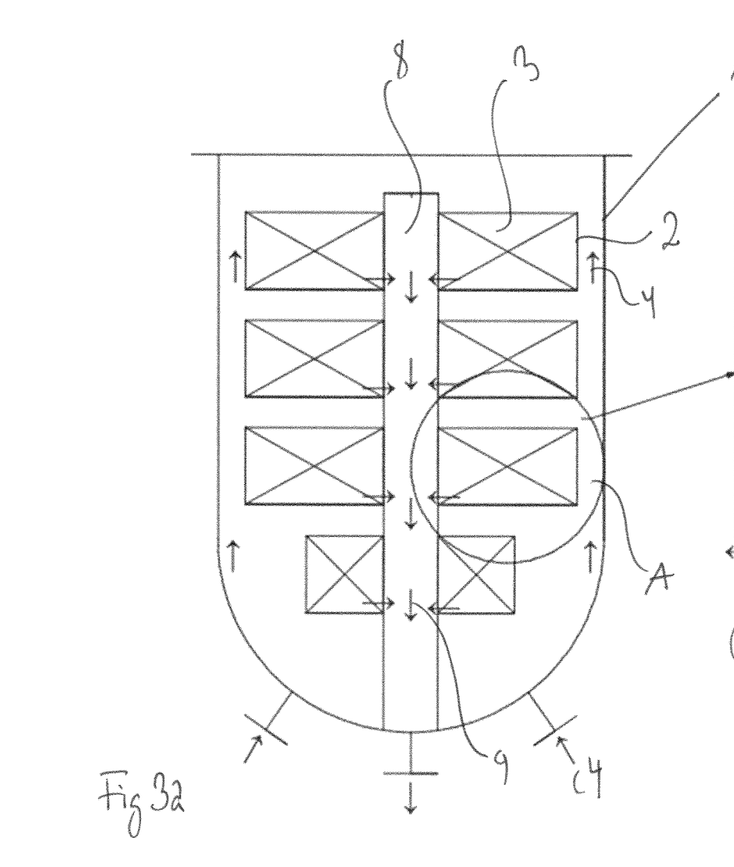
Figure 3B:
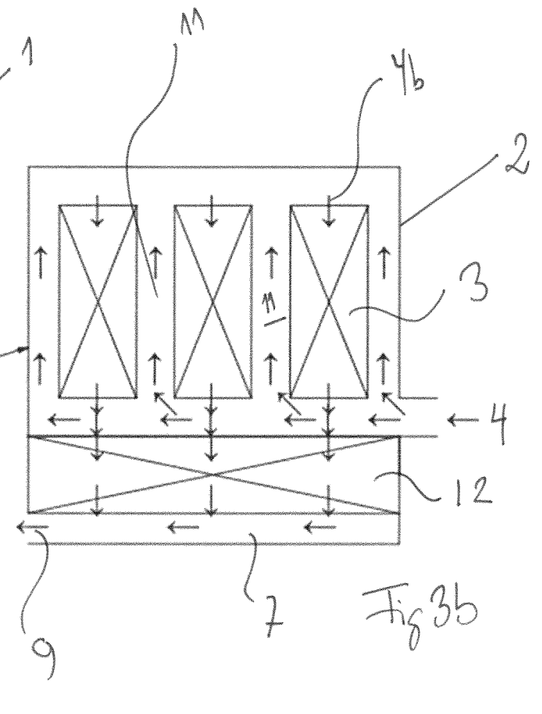

FIGS. 3a and b illustrates the flow and catalyst layers in a converter having four countercurrent cooled modules. FIG. 3a, shows a simplified converter and simplified flow showing process gas 4 and product gas 9. FIG. 3b shows an enlarged section A of FIG. 3a. Process gas 4 enters the cooling channels 11 of the module 2. When the process gas passes through the cooling channels the process gas is heated and the cooled catalyst layer 3 of the module is cooled. The heated process gas 4b thereafter passes through the cooled catalyst layer and subsequently a non-cooled adiabatic layer 12 in the module before it leaves the module through collecting means 7 and is passed to the center tube (not shown).

Figures 4A, 4B:
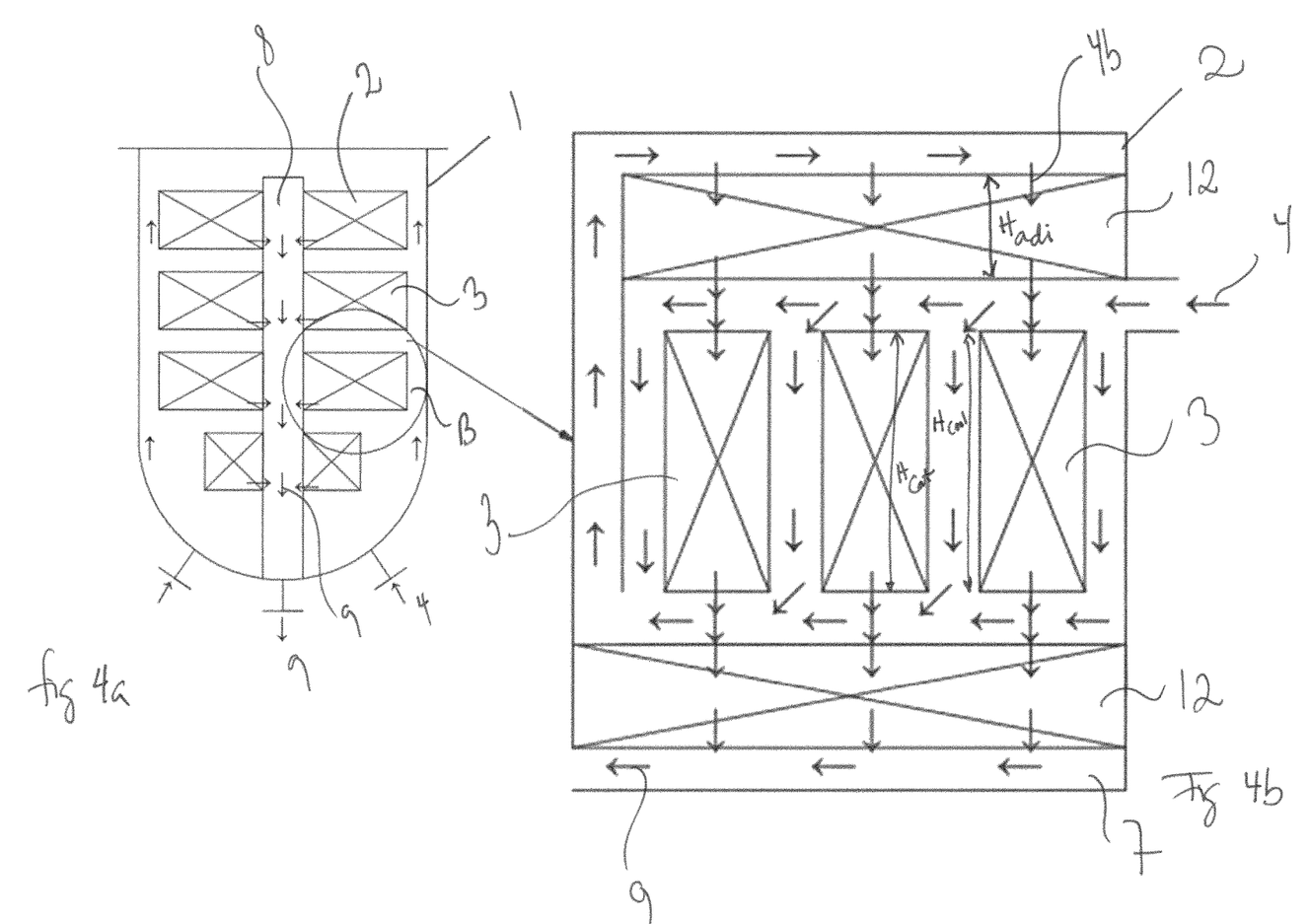

FIGS. 4a and b, shows the flow through a co-current cooled converter having four cooled modules. Each module having a single cooled catalyst layer 3 having an adiabatic catalyst layer 12 above and below said cooled catalyst layer.

Figure 5:
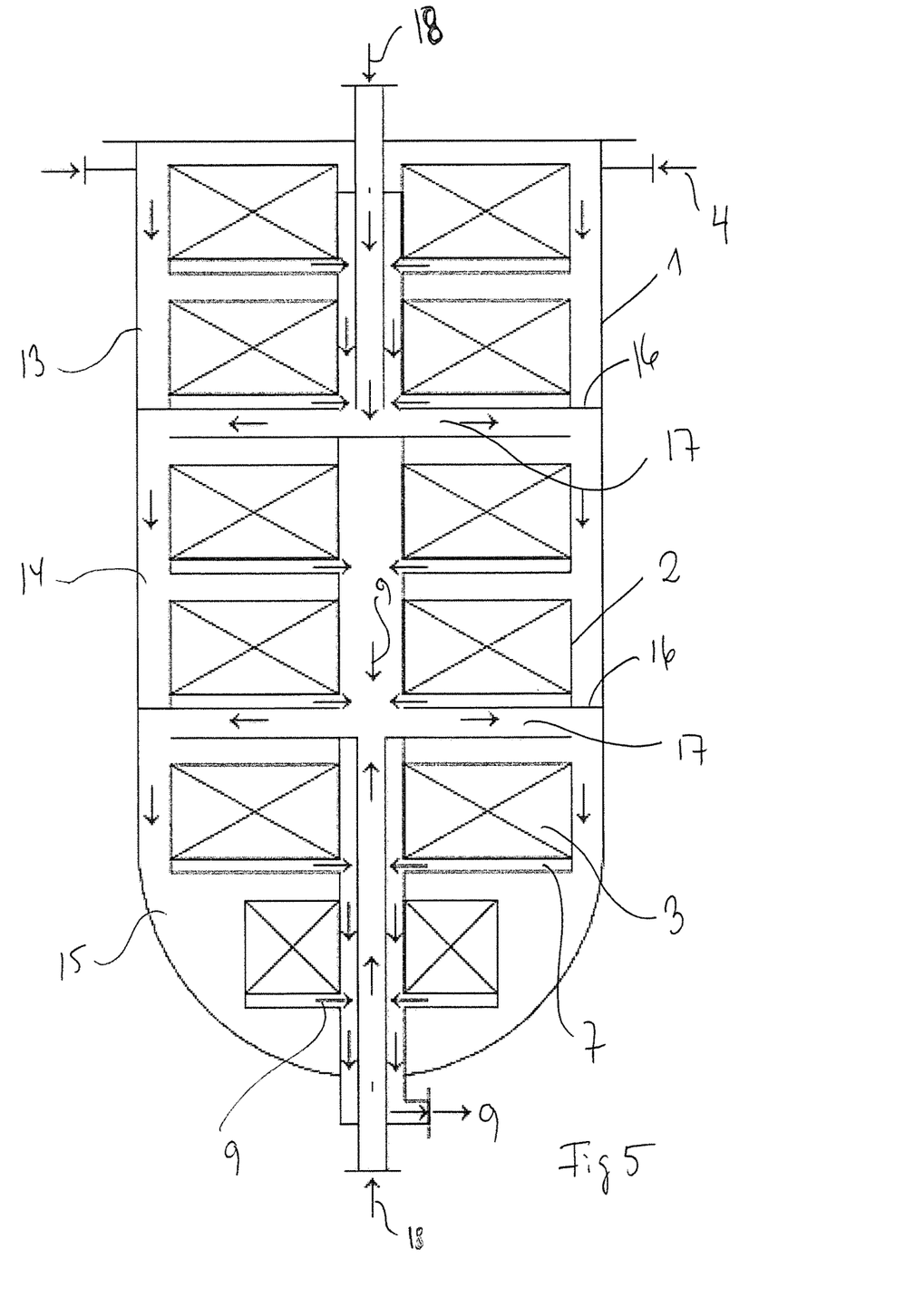

FIG. 5 shows a schematic view of a converter having six modules 2 divided into three section 13, 14, 15 operated in series. The sections are separated by plates or other separating means. 16 The two modules in each section are operated in parallel. Between the sections are quenching zones 17 in which hot product gas 9 meets colder quench gas 18 before the mix of product gas and quench gas enters the subsequent section and the two modules therein.

The invention claimed is:

1. A cooled axial flow converter, comprising:
an outer annulus,
a catalyst bed comprising one or more modules, each of the modules comprising: (1) at least one catalyst layer, wherein process gas passes from the outer annulus to the catalyst bed, the process gas being converted to a product gas by passing axially down through the catalyst bed, and (2) an adiabatic layer above and/or below the catalyst layer, said adiabatic layer having a diameter, a cross sectional area and a height,
feed means arranged to provide a flow of the process gas from the outer annulus to an inlet part of the one or more modules,
collector means arranged under the catalyst layer of each module to provide a stream of converted process gas which has passed axially down through the catalyst layer of the one or more of the modules to a center tube of the converter, and
wherein at least one of the one or more modules comprises one or more cooling plates arranged to be cooled by a cooling fluid passing through channels of the cooling plates.

2. Cooled axial flow converter according to claim 1, wherein the feed means are at least partly contained in the cooling plates, and wherein said cooling plates and feed means are arranged to allow the process gas to be pre-heated while passing through said feed means, while at the same time the reaction heat is at least partly removed from the one or more catalyst layers in the module.

3. Cooled axial flow converter according to claim 1, comprising two or more modules.

4. Cooled axial flow converter according to claim 1, wherein the one or more cooling plates of each module divides the module into two or more cooled catalyst channels having a total catalyst cross sectional area.

5. Cooled axial flow converter according to claim 4, wherein the flow in the cooling channels is either countercurrent or co-current to the flow in the catalyst channels.

6. Cooled axial flow converter according to claim 4, wherein the modules have identical cooling channel and catalyst channel height within plus/minus five percent, identical ratio between cooling channel and catalyst channel width within plus minus ten percent, identical ratio between cooling channel and catalyst channel cross sectional area within plus minus five percent and contains identical type of catalyst.

7. Cooled axial flow converter according to claim 1, wherein the cooling plates comprises at least one cooling channel having a width W and a height H and wherein the module comprises a cooled catalyst layer with height H.

8. Cooled axial flow converter according to claim 1, wherein the distance between the cooling plates of each module deviates by a maximum ±15% from constant.

9. Cooled axial flow converter according to claim 1, wherein the converter is arranged for two or more modules to be operated in parallel and/or in series.

10. Cooled axial flow converter according to claim 1, wherein the pressure drop is the same within ±5% across modules operated in parallel.

11. Cooled axial flow converter according to claim 1, wherein the height of cooling channel and catalyst layer of modules operated in parallel are the same within ±5%.

12. Cooled axial flow converter according to claim 1, wherein the ratio between total cross sectional area of the cooling plates and the total catalyst cross sectional area are the same within ±10% of modules operated in parallel.

13. Cooled axial flow converter according to claim 1, comprising two or more module sections, each module section containing one or more of the modules.

14. Cooled axial flow converter according to claim 13, wherein the modules in different sections may be different from each other, contain different catalyst and differently arranged.

15. Cooled axial flow converter according to claim 13, wherein at least two or more sections are arranged to operate in parallel.

16. Cooled axial flow converter according to claim 13, wherein two or more sections are arranged to operate in series.

17. Cooled axial flow converter according to claim 1, which is used as ammonia reactor, methanol reactor, methanization reactor, shift reactor and other exothermic reaction processes.

18. Cooled axial flow converter according to claim 1, wherein the converter contains additional means for supply of preheated process gas.

19. Cooled axial flow converter according to claim 1, wherein the converter contains means for supply of fresh process gas.

20. Cooled axial flow converter according to claim 19, wherein the means for supply of fresh process gas is connected to the at least one module comprising at least one catalyst layer.

21. A cooled axial flow converter, comprising:
an outer annulus,
a catalyst bed comprising one or more modules, each of the modules comprising at least one catalyst layer, wherein process gas passes from the outer annulus to the catalyst bed, the process gas being converted to a product gas by passing axially down through the catalyst bed, and wherein at least one of the one or more modules comprises one or more cooling plates arranged to be cooled by a cooling fluid passing through channels of the cooling plate, feed means arranged to provide a flow of the process gas from the outer annulus to an inlet part of the one or more modules, collector means arranged under the catalyst layer of each module to provide a stream of converted process gas which has passed axially down through the catalyst layer of the one or more of the modules to a center tube of the converter, and a quenching zone arranged to quench the product gas from at least one module section thereby obtaining a quench product stream.

22. Cooled axial flow converter according to claim 21, wherein each of the modules comprises an adiabatic layer above and/or below the catalyst layer, said adiabatic layer having a diameter, a cross sectional area and a height.

23. Cooled axial flow converter according to claim 22, wherein the height of the adiabatic catalyst layer in each of the modules is identical plus minus five percent.

24. Cooled axial flow converter according to claim 21, comprising means to provide at least part of the quench product stream as a feed for one or more subsequent sections.

25. Cooled axial flow converter according to claim 21, wherein, in the quenching zone, a quench gas is added to the product gas, the quench gas comprising fresh process gas and/or partly converted, optionally cooled process gas.

26. A cooled axial flow converter, comprising:
an outer annulus,
a catalyst bed comprising one or more modules, each of the modules comprising at least one catalyst layer, wherein process gas passes from the outer annulus to the catalyst bed, the process gas being converted to a product gas by passing axially down through the catalyst bed, and wherein at least one of the one or more modules comprises one or more cooling plates arranged to be cooled by a cooling fluid passing through channels of the cooling plate, feed means arranged to provide a flow of the process gas from the outer annulus to an inlet part of the one or more modules, collector means arranged under the catalyst layer of each module to provide a stream of converted process gas which has passed axially down through the catalyst layer of the one or more of the modules to a center tube of the converter, and means for supply of preheated process gas, wherein the means for supply of preheated process gas is arranged to bypass the outer annulus and the cooling plates.

* * * * *